(12) United States Patent
Gerking

(10) Patent No.: US 6,800,226 B1
(45) Date of Patent: Oct. 5, 2004

(54) METHOD AND DEVICE FOR THE PRODUCTION OF AN ESSENTIALLY CONTINOUS FINE THREAD

(76) Inventor: Lüder Gerking, Hohe Ähren 1, Berlin (DE), 14195

( * ) Notice: Subject to any disclaimer, the term of this patent is extended or adjusted under 35 U.S.C. 154(b) by 15 days.

(21) Appl. No.: 10/030,020

(22) PCT Filed: Jun. 21, 2000

(86) PCT No.: PCT/EP00/05703
§ 371 (c)(1),
(2), (4) Date: Dec. 26, 2001

(87) PCT Pub. No.: WO01/00909
PCT Pub. Date: Jan. 4, 2001

(30) Foreign Application Priority Data

Jun. 24, 1999 (DE) .......................................... 199 29 709

(51) Int. Cl.[7] .............................................. B29C 47/92
(52) U.S. Cl. ................. 264/40.3; 264/555; 264/177.13; 264/177.16
(58) Field of Search ........................... 264/555, 177.13, 264/177.16, 40.3

(56) References Cited

U.S. PATENT DOCUMENTS

| | | | | |
|---|---|---|---|---|
| 3,751,767 A | * | 8/1973 | Marshall ........................ | 19/58 |
| 4,001,357 A | * | 1/1977 | Walz et al. .................... | 264/12 |
| 4,060,355 A | * | 11/1977 | Walz et al. .................... | 425/7 |
| 4,211,737 A | * | 7/1980 | Di Drusco et al. ............ | 264/12 |
| 4,316,731 A | * | 2/1982 | Lin et al. ....................... | 65/466 |
| 4,472,329 A | * | 9/1984 | Muschelknautz et al. ..... | 264/12 |
| 4,533,376 A | * | 8/1985 | Muschelknautz et al. ..... | 65/463 |
| 4,539,029 A | * | 9/1985 | Muschelknautz et al. ..... | 65/463 |
| 4,642,262 A | * | 2/1987 | Piotrowski et al. ........... | 442/409 |
| 4,676,815 A | * | 6/1987 | Wagner et al. ................ | 65/525 |
| 4,710,336 A | * | 12/1987 | Credali et al. ........... | 264/172.15 |
| 4,828,469 A | * | 5/1989 | Right ............................. | 425/7 |
| 5,075,161 A | * | 12/1991 | Nyssen et al. .............. | 442/335 |
| 5,164,198 A | * | 11/1992 | Bauckhage et al. ............ | 425/6 |
| 5,260,003 A | * | 11/1993 | Nyssen et al. ................. | 264/6 |
| 5,599,488 A | * | 2/1997 | Prof e ....................... | 264/40.3 |
| 5,714,171 A | * | 2/1998 | Profe .......................... | 425/66 |

FOREIGN PATENT DOCUMENTS

| | | |
|---|---|---|
| EP | 0 339 240 A2 | 3/1989 |
| EP | 0 515 593 B1 | 11/1991 |
| EP | 0 724 029 A1 | 1/1996 |
| WO | WO 92/10599 | 6/1992 |

* cited by examiner

*Primary Examiner*—Mark Eashoo
(74) *Attorney, Agent, or Firm*—Baker Botts L.L.P.

(57) ABSTRACT

The invention relates to a method and a device for the production of essentially continuous fine threads made of meltable polymers. The polymer melt is spun from at least one spin hole (5) and the spun thread is attenuated using gas flows which are accelerated to achieve high speeds by means of a Laval nozzle (6). As a result of the specific geometry of the melt hole (4) and the position thereof in respect to the Laval nozzle (6), the temperature of the polymer melt, the throughout per spin hole and the pressures determining the velocity of the gas flow upstream and downstream from the Laval nozzle (6) are controlled in such a way that the thread reaches an internal hydrostatic pressure before solidifying, whereby said thread bursts into a plurality of fine threads.

13 Claims, 3 Drawing Sheets

METHOD AND DEVICE FOR THE PRODUCTION OF AN ESSENTIALLY CONTINOUS FINE THREAD

FIELD OF THE INVENTION

The invention concerns a method for the manufacture of very fine threads from melt-spinnable polymers and an apparatus for the manufacture thereof

BACKGROUND OF THE RELATED TECHNOLOGY

Microthreads of this kind, but usually microfibres of finite length, have for many years been made by a hot-air spun-blown method, the so-called melt-blown method, and today there are different apparatuses for this. A common feature of all of them is that, in addition to a row of melt holes—several rows parallel to each other have also become known—hot air which draws the threads escapes. By mixing with the colder ambient air, there is cooling and solidification of these threads or fibres, for often, usually of course undesirably, the threads break. The disadvantage of this melt-blown method is the high expenditure of energy to heat the hot air flowing at high speed, a limited throughput through the individual spin holes (even though these have been set increasingly closer together in the course of time, down to a spacing of below 0.6 mm with 0.25 mm in hole diameter), that with thread diameters of less than 3 $\mu$m breaks occur, which leads to beads and protruding fibres in the subsequent textile composite, and that due to the high air temperature necessary to produce fine threads the polymers are thermally damaged well above the melt temperature. The spinning nozzles, of which a large number have been proposed and also protected, are elaborate injection moulding dies which have to be made with high precision. They are expensive, operationally susceptible and tedious to clean.

SUMMARY OF THE INVENTION

It is therefore the object of the present invention to provide a method and an apparatus for the manufacture of essentially endless threads, which require less expenditure of energy, do not cause thread damage on account of excessive temperatures and use a spinning tool of simple construction.

This object is achieved according to the invention by the characteristics of the independent claims.

The present invention avoids the disadvantages of the state of the art by the fact that polymer melt is pressed out of spin holes, which are arranged in one or more parallel rows or rings, into a chamber having a given pressure which is filled with gas, as a rule with air, and which is separate from the environment, wherein in the molten state the threads pass into a region with rapid acceleration of this gas at the outlet from the chamber. The forces transmitted to the respective thread on the way there by shear stress increase, its diameter decreases greatly and the pressure in its still liquid interior increases to a corresponding extent in inverse proportion to its radius due to the effect of the surface tension. Due to the acceleration of the gas, its pressure drops by the laws of flow mechanics. In the process, the conditions of the melt temperature, gas flow and its rapid acceleration are coordinated with each other in such a way that the thread before solidification thereof attains a hydrostatic pressure in its interior which is greater than the surrounding gas pressure, so that the thread bursts and divides into a plurality of fine threads. Due to a gap at the bottom in the chamber, threads and air leave the latter. Bursting takes place after the gap and under otherwise unchanged conditions with surprising stability at a given fixed location. In the region of great acceleration, gas and thread streams run parallel, the flow by interface around the threads being laminar. Continued splitting of the original thread monofilament occurs without bead formation and breaks. From a monofilament is produced a multifilament of very much finer threads using a gas stream having ambient temperature or gas stream slightly above this.

The new threads arising from splitting are considerably finer than the original monofilament. They may even still be drawn slightly after the splitting point until they are solidified. This happens very quickly because of the greater thread area suddenly created. The threads are endless. But more to a minor extent they can be threads of finite length due to deviations in the polymer, individual speed or temperature disturbances, dust in the gas and the like disturbances in real industrial processes. The process of splitting thread-forming polymers can be adjusted in such a way that the numerous very much finer single filaments produced from the monofilament are endless. The threads have a diameter of well below 10 $\mu$m, mainly between 1.5 and 5 $\mu$m, which in the case of polymers corresponds to a titre of between about 0.02 and 0.2 dtex, and are referred to as microthreads.

The area of great acceleration and pressure drop in the gas stream is according to the invention realised in the form of a Laval nozzle with convergent contour to a narrowest cross-section and then rapid widening, the latter already so that the newly formed single threads running adjacent to each other cannot stick to the walls. In the narrowest cross-section, with a suitable choice of pressure in the chamber (in the case of air, about twice as high as the ambient pressure behind), the speed of sound can prevail, and in the wider portion of the Laval nozzle supersonic speed prevails.

For the manufacture of non-woven thread fabrics (spun-bonded fabrics), spinning nozzles in row form and Laval nozzles of rectangular cross-section are used. For the manufacture of yarns and for special kinds of non-woven fabric manufacture, round nozzles with one or more spin holes and rotationally symmetrical Laval nozzles can also be used.

The method borrows from methods for the manufacture of metal powders from melts, from which it was developed. According to DE 33 11 343, the molten metal monofilament in the region of the narrowest cross-section of a Laval nozzle bursts into a large number of particles which are deformed into pellets by the surface tension and cooled down. Here too the result is a liquid pressure in the interior of the melt monofilament which outweights the surrounding laminar gas flow. If the pressure drop takes place so rapidly that solidification is not yet close, the pressure forces can outweigh the forces of cohesion of the molten mass, mainly viscosity forces, and bursting into a plurality of filament pieces (ligaments) occurs. The crucial factor here is that the thread must remain liquid at least in the interior so that this mechanism can set in. It has therefore also been proposed to further heat the monofilament after its emergence from the spinning nozzle.

Automatic bursting of a molten metal thread is also named the "NANOVAL effect" after the firm which uses it.

Defibration by bursting has become known in the manufacture of mineral fibres, thus in DE-A-33 05 810. By interfering with the gas flow in a rectangular channel arranged below the spinning nozzle by means of fittings which generate cross flows, as stated there the result is defibration of the single melt monofilament. In a not quite clear account there is mention of defibration by static pressure gradient in the air flow, and in fact in EP 0 038 989 drawing from a 'loop or zigzag movement . . . after the fashion of a multiple whiplash effect'. The fact that the actual 'defibration' is caused by an increase in pressure in the interior of the thread and decrease in the surrounding gas flow was not recognised, nor any control mechanisms in this direction.

For polymers, this finding from mineral fibre manufacture was obviously made use of by the same applicant firm. In DE-A-38 10 596 in an apparatus according to FIG. 3 and description in example 4 the melt stream of polyphenylene sulphide (PPS) is 'defibrated by a high static pressure gradient'. The gas streams are hot, even heated beyond the melting point of the PPS. A static pressure gradient in the gas flow, decreasing in the direction of thread travel, cannot on its own defibrate the thread. It was not recognised that, for this, the melt stream must remain liquid in its interior, at least in an adequate portion. But by using hot air in the region of the polymer melt temperature, this happens by itself. It is not a 'pressure gradient occurring after the outlet holes', column 1, lines 54–55 that draws the melt streams into fine fibres, but a static pressure gradient between melt stream and surrounding gas flow that causes it to split or defibrate. The threads produced are of finite length and amorphous.

The threads of the method according to the invention on the other hand are endless or essentially endless. They are produced by selectively controlled bursting of a still molten monofilament in a laminar gas flow surrounding them, that is, without turbulence-generating cross flows. Basically all thread-forming polymers are considered, such as polyolefins PP, PE, polyester PET, PBT, polyamides PA 6 and PA 66 and others such as polystyrene. Here, those such as polypropylene (PP) and polyethylene (PE) are to be regarded as favourable because surface tension and viscosity are in a ratio which readily allows the build-up of an internal thread pressure against the surface tension force of the thread skin, while the viscosity is not so high that bursting is prevented. The ratio of surface tension to viscosity can be increased by increasing the melt temperature in most polymers. This takes place in a simple manner in melt manufacture and can be reinforced by heating the spinning nozzles shortly before emergence of the threads. Heating the threads afterwards by hot gas streams does not however take place according to the present invention.

It can be established that the subject of the invention, controlled splitting of a polymer thread drawn with cold air into a plurality of finer single threads of endless or essentially endless single threads, has not yet been found. This takes place by the automatic effect of bursting of the melt thread due to a positive pressure difference between the hydraulic pressure in the thread, arising from the surface tension of the thread envelope, and the gas flow surrounding it. If the pressure difference is so great that the strength of the thread envelope is no longer sufficient to hold together the interior, then the thread bursts. Splitting into a plurality of finer threads occurs. The gas, usually air, can be cold, i.e. does not have to be heated, only the process conditions and the apparatus must be such that the melt monofilament in its critical diameter which depends on the melt viscosity and the surface tension of the polymer concerned is not cooled to such an extent that it can no longer burst due to the internal liquid pressure building up. Also the melt holes must not be cooled by the gas so greatly that the melt cools down too greatly, let alone already solidifies there. The process and geometrical conditions for producing this splitting effect are relatively easy to find.

The advantage of the present invention lies in that, in a simple and economical manner, very fine threads within a range of well below 10 $\mu$m, mainly between 2 and 5 $\mu$m, can be produced, which in the case of pure drawing for example by the melt-blow method can be accomplished only with hot gas (air) jets heated above melting point, and so requires considerably more energy. Moreover, the threads are not damaged in their molecular structure by excessive temperatures, which would lead to reduced strength, with the result that they can then often be rubbed out of a textile structure. Another advantage lies in that the threads are endless or quasi-endless and cannot protrude from a textile structure such as a non-woven fabric and come away as fuzz. The apparatus for carrying out the method according to the invention is simple. The spin holes of the spinning nozzle can be larger and so less susceptible to breakdowns, and the Laval nozzle cross-section in its precision does not need the narrow tolerances of the lateral air slots of the melt-blown method. For a given polymer one need only coordinate the melt temperature and the pressure in the chamber with each other, and with a given throughput per spin hole and the geometrical position of the spin holes relative to the Laval nozzle splitting occurs.

BRIEF DESCRIPTION OF THE DRAWINGS

Practical examples of the invention are shown in the drawings and described in more detail in the description below. They show.

DETAILED DESCRIPTION OF THE PREFERRED EMBODIMENT

Figure 1:
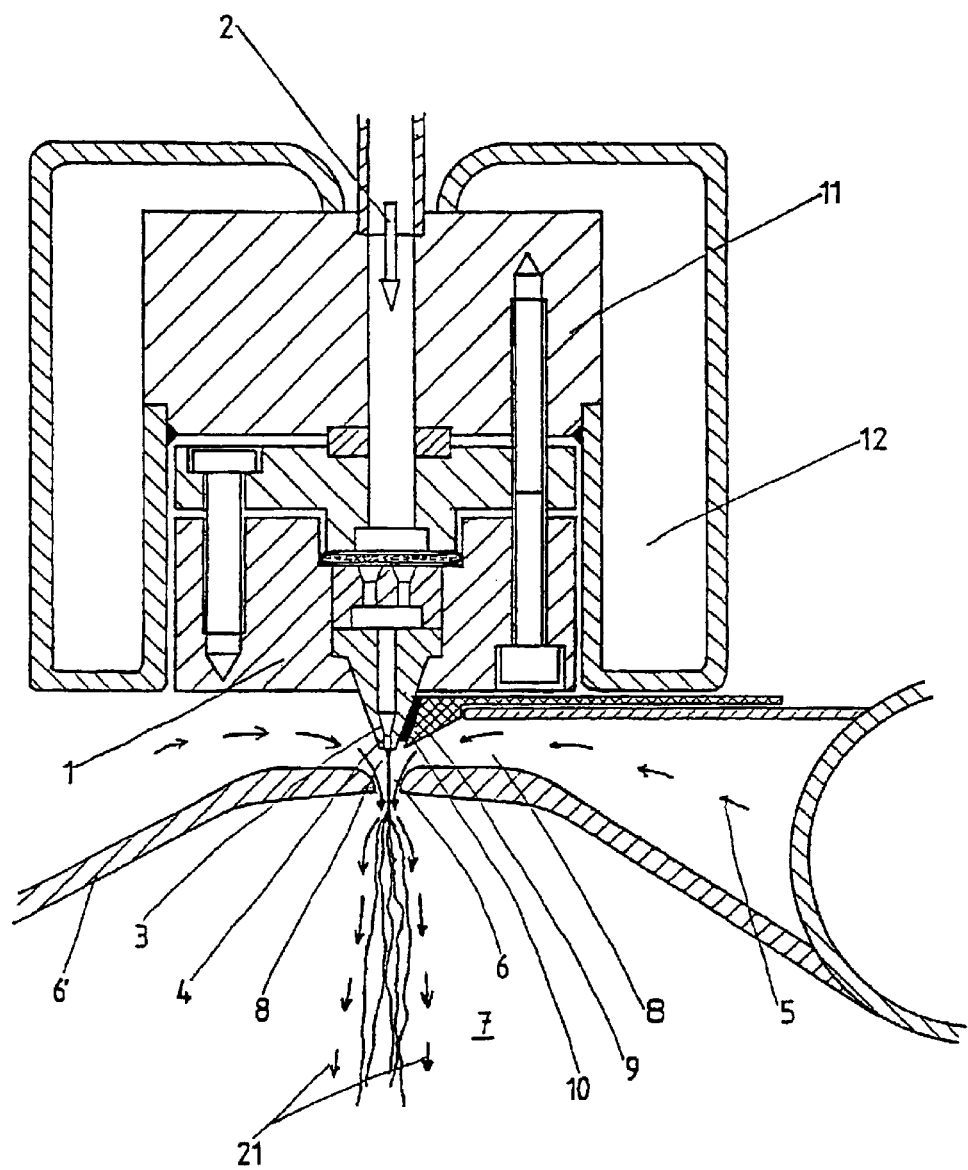
FIG. 1 a schematic sectional view of an apparatus for the manufacture of microthreads by means of cold gas jets by bursting of a melt stream into a plurality of single threads according to a first embodiment of the invention, FIG. 2 a perspective partial view of the apparatus according to the invention in an embodiment with row nozzle and spin holes in nipple form for the manufacture of non-woven fabrics from microthreads, and FIG. 3 a partial view in section of the spinning nozzle and Laval nozzle according to a third embodiment of the invention.

In FIG. 1 is shown an apparatus for the manufacture of essentially endless fine threads from melt-spinnable polymers, which comprises a spinning head or spinning beam 11, not described in more detail, in which is held a spinning nozzle 1. The spinning head 11 and the spinning nozzle are in a generally known manner composed of different parts, so that a description of them is omitted. The spinning head or spinning beam 11 is surrounded by a heating system 12 which is designed as a system for liquid or steam heating via chambers or as an electric band heating system. The spinning head or spinning beam is connected to melt-proportioning devices, not shown, such as spinning pumps and extruders, which are the usual devices for the manufacture of synthetic fibres, so that these are not described further either.

The spinning nozzle comprises a nozzle orifice 3 which comprises one, or usually several spin holes arranged in a row. Several parallel rows are possible too. Below the spinning head 11 is located a plate 6' with a gap 6 which is of convergent-divergent construction and widens greatly due to a space 7 located below it and forms a Laval nozzle. Depending on the shape of the spinning nozzle 1, the Laval nozzle 6 is constructed rotationally symmetrically similarly to a stop in the case of a single nozzle or as a longitudinal gap in the case of a row nozzle. The spinning nozzle or the spin holes of the spinning nozzle end just above the Laval nozzle 6 or in the plane of the plate 6', but the spinning nozzle 1 can also extend slightly into the Laval nozzle 6.

Between spinning head and plate 6' is located a closed chamber 8, to which gas is supplied in the direction of the arrows 5 for example by a compressor. The gas is usually at ambient temperature, but can be at a slightly higher temperature, for example 70 to 80°, on account of the heat of compression from the compressor.

The nozzle orifice 3 is surrounded by an insulating assembly 9 which protects the nozzle orifice 3 against excessive heat losses due to the gas flow 5. In addition an electric band heating system 10 can be arranged between insulating assembly 9 and orifice 3.

The space 7 is usually at ambient pressure, while the gas in the chamber 8 is at an elevated pressure compared with the space 7. In the case of directly following further processing into a non-woven fabric or other thread structures, the space 7 can be at a slightly elevated pressure compared with ambient pressure, i.e. atmospheric pressure, for example a few mbar higher, which is needed for the further processing, such as non-woven fabric laying or other thread collecting devices.

The polymer melt is pressed in the direction of the arrow 2 out of the nozzle orifice 3 out of the spin hole or opening 4 as a melt monofilament, and is picked up by the gas jets 5 and tapered to smaller diameters by shear stresses at its circumference. As the basically cold gas streams, which can be air streams, cool it down, after a few millimetres it must pass into the narrowest region of the Laval nozzle and so into an area of lower pressure. As soon as the taper has progressed so far and due to the effect of the surface tension of the melt at the thread envelope the pressure in the interior has increased so far that it is above that of the gas flow, bursting of the monofilament occurs, namely when the thread envelope can no longer hold the melt thread together against the internal pressure which has increased with thread constriction. The melt monofilament is divided into single threads which, on account of the temperature difference between melt and cold gas or air and the suddenly greatly increased surface area of the single threads referred to the thread mass, cool down rapidly. Hence a given number of very fine essentially endless single threads is produced.

It follows from the nature of such bursting processes similar to explosions that the number of threads produced after the splitting point, which can be for example 5 to 25 mm below Laval nozzle 6, cannot be constant. Because of the short distance which thread and gas together cover up to the splitting point, the flow interface around the thread is laminar. Preferably also the air from the supply pipes is conducted in laminar fashion as far as possible to the region of splitting. This has the advantage of the lower flow losses and hence the lower energy requirements which distinguish laminar flows compared with turbulent ones, but also a more uniform time curve of splitting, because disturbances due to turbulent changes are absent. The accelerated flow such as is present in the cross-section of the Laval nozzle 6 remains laminar and can even be laminarised if a certain turbulence prevailed before.

The added advantage of laminar drawing of the melt monofilament up to the splitting point and also beyond it leads to splitting into more uniform single threads, because there are not greater differences in the flow rate and hence in the sheer stress acting on the melt monofilament and resulting single threads and in the pressure of gas flow. The distribution of the thread diameters is, as it turned out surprisingly, very narrow, e.g. propylene threads whose diameters are all between 2 and 4 µm can be produced.

As already stated above, the speed of gas flow in the direction of the arrows 5 increases constantly towards the spin hole 4 and then in the Laval nozzle 6. In the narrowest cross-section of the Laval nozzle it can increase up to the speed of sound if the critical pressure ratio, depending on the gas, is reached, and in the case of air the ratio between the pressure in the chamber 8 and the space 7 is around 1.9.

The threads move downwards in the direction of the arrows 21 and for example can be deposited on a belt, not shown, to form a non-woven fabric, or otherwise further treated.

Figure 2:
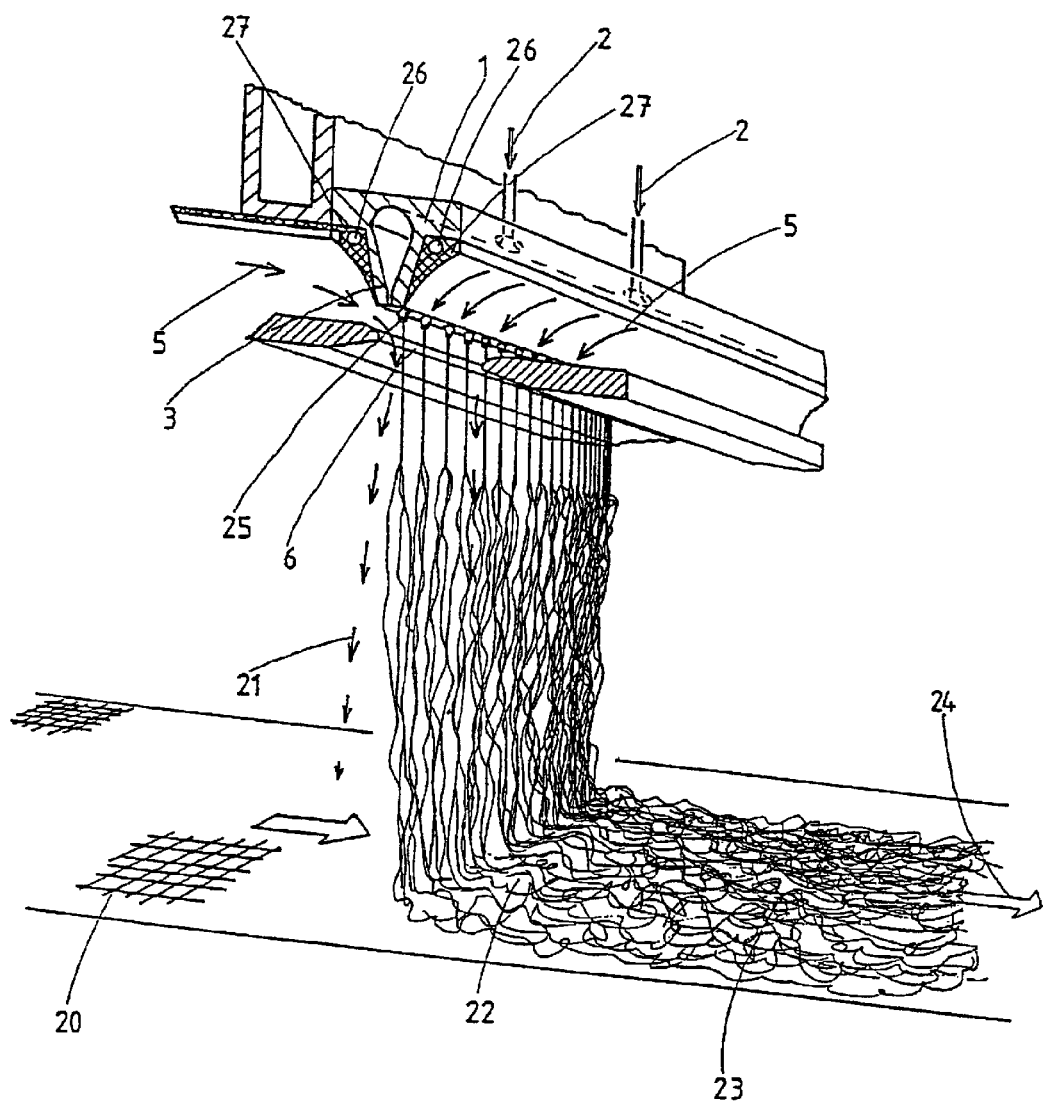

In FIG. 2 is shown a further example of the present invention, in which the spinning nozzle 1 is constructed as a row nozzle. Here are shown in particular the outlet points of the spinning nozzle 1 with orifice 3 which comprises nipples 25. This form allows concentric access of the gas to the melt monofilament, which proved to be advantageous for splitting, both with respect to the obtainable fineness of the threads and with respect to the width of fluctuation of their diameters.

By contrast with the band heating system 10 according to FIG. 1, here round heating elements 26 are shown for the supply of heat to the nozzle orifice 3 which is shielded by insulators 27 from the gas flow 5. The threads leave the Laval nozzle in a wide curtain together with the gas, and move in the direction of the arrows 21 towards a collecting belt 20 and are deposited in the at region 22 to form a non-woven fabric 23. The non-woven fabric 23 leaves the area of its manufacture in the direction of arrow 24.

Figure 3:
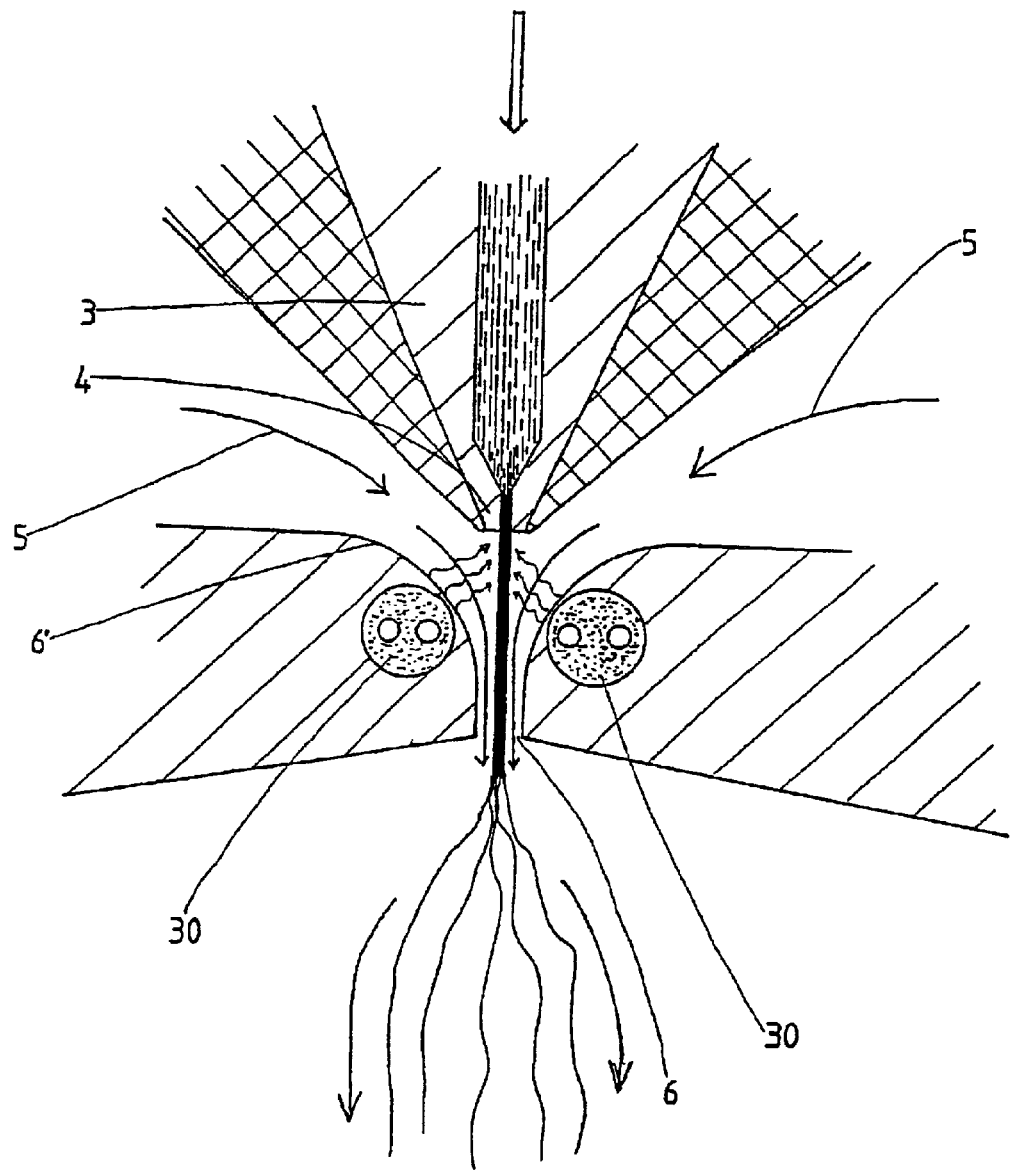

A further embodiment of the spinning and splitting apparatus according to the invention is shown in FIG. 3. Here again the melt monofilament is expelled from an insulated nozzle orifice 3 with one or more melt holes 4 and picked up by the laterally applied gas stream 5 and drawn in length into thinner diameters by shear stress forces. In the plate 6' in the region of the Laval nozzle 6 a heating device 30 is incorporated. On the way to the narrowest cross-section of the Laval nozzle 6, therefore, the melt monofilament has heat supplied to it by radiation. As a result, cooling by the basically cold air/gas streams is delayed. The melt monofilament passes, drawn to a smaller diameter, into the partial-pressure area of the Laval nozzle 6 and can split into even finer single threads.

The following examples describe methods and apparatuses with the essential process data used with different raw materials and the thread results.

EXAMPLE 1

By means of a laboratory extruder (screw with a diameter of 19 mm and L/D=25) for the processing of polymers, polypropylene (PP) with a MFI (melt flow index) of 25 (230° C., 2.16 kg) was melted and supplied via a gear spinning pump to a spinning head with a nozzle orifice 3 comprising seven holes 4 arranged in a row at equal intervals of 4.5 mm each, with a diameter of the holes 4 of 1 mm. The melt-conducting pipes were heated from the outside by electric band heating systems. The nozzle orifice 3 was insulated according to FIG. 1 at its flanks by a ceramic insulator 9 (calcium silicate) against the gas flow below it and heated with electric heating systems. Below the spinning nozzle 1 was located the chamber 8 for gas supply. Air which was taken from a compressed air network and fed into the latter by a compressor was taken as the gas in this and the other examples. The chamber 8 was defined at the bottom by a plate which had a slot forming the Laval nozzle 6 with a width of 4 mm at its narrowest cross-section. The lateral supply cross-sections for the air in the chamber had a height of 32 mm, measured from the upper edge of the Laval nozzle plate 6'. The outlet openings of the holes 4 were arranged exactly at the level of the upper edge of the Laval nozzle plate 6' and had a distance of 10 mm from the narrowest cross-section of the Laval nozzle 6.

Melt pressure and temperature between spinning pump and connecting piece to the spinning nozzle 1 were measured with a strain-gauge pressure measuring device (Dynisco, model MDA 460) or a thermoelement.

Characterisation of the threads obtained is by the thread diameter $d_{50}$ averaged over 20 single measurements, and if required also by the standard deviation s.

Splitting is characterised by the theoretical thread count N. This indicates how many single filaments of the measured average thread diameter $d_{50}$ must move at the maximum possible speed through the narrowest cross-section of the Laval nozzle 6 in order to convert the measured melt mass to single filaments. The maximum possible speed is the gas speed in the narrowest cross-section of the Laval nozzle 6, which is either the speed of sound which can be calculated from the conditions in the chamber 8 or, in the event that the critical pressure ratio which is needed to attain the speed of sound is not attained, can be calculated from these conditions with Saint-Venant and Wantzell's formula. If the theoretical thread count N is more than 1, the thread diameter observed cannot have been produced simply by drawing, this would be contrary to the law of preservation of mass. For the observed theoretical thread counts N well over 1, only splitting is possible as an explanation. A multiple whiplash effect can perhaps explain values just over 1 to 10, but not the observed values of up to 627. As the actual thread speed must be below the maximum, the single filament number actually obtained will be above the theoretical number.

At a melt temperature of 340° C. and a melt pressure between spinning pump and connecting piece to the spinning nozzle 1 of approximately 1 bar above the pressure in the pressure 8, which was approximately also the pressure in front of the spinning capillaries, and with a quantity proportioned via the spinning pump of 43.1 g/min, that is, 6.2 g/min per hole, the following thread values resulted at the different pressures in the chamber 8 above the atmospheric pressure in space 7:

0.25 bar $d_{50}$=7.6 μm, N=123

0.5 bar $d_{50}$=4.4 μm, N=276

1.0 bar $d_{50}$=3.9 μm, N=283

If only 4.6 g/min are passed through instead of 6.2 g/min per hole, at a pressure in the chamber 8 of 0.5 bar a $d_{50}$ of 3.0 μm instead of 4.4 μm is obtained.

How important exact coordination of melt temperature, melt quantity and gas flow is, is shown by the following example of a distance between the holes 4 of 15 mm, a throughput per hole 4 of 4.6 g/min and a pressure in the chamber 8 of 0.5 bar:

melt temperature 340° C. $d_{50}$=3.0 μm, s=0.8 μm, N=187 melt temperature 305° C. $d_{50}$=8.2 μm, s=4.7 μm, N=25.

Clearly conditions are such that around the monofilaments there has already formed a cold envelope which greatly hinders splitting. Not the whole monofilament is split open, but only a portion, which can be seen by the fact that, although the minimum observed thread diameter has not changed (some therefore split open), some single filaments with a diameter of more than 10 μm occur. Thus no splitting has occurred there. At the higher temperature, on the other hand, all single filaments are between 1.6 μm and 4.8 μm. The greater variance of thread diameters is reflected in the much greater standard deviation.

A design of the orifice 3 with nipples 25 according to FIG. 2 allows the manufacture of much finer threads with a smaller width of fluctuation and/or a distinct increase in throughput. Thus, for a temperature of 370° C., a distance between holes 4 of 15 mm, a distance from outlet openings of the holes 4 to the narrowest cross-section of the Laval nozzle of 8.5 mm (the outlet openings are submerged 1.5 mm in the imaginary plane of the Laval nozzle plate) and a pressure in the chamber 8 of 0.75 bar, the following thread values are obtained:

6.2 g/min per hole $d_{50}$=2.1 μm, s=0.30 μm, N=445

12.3 g/min per hole $d_{50}$=2.5 μm, s=0.60 μm, N=627

EXAMPLE 2

With the apparatus from example 1, polyamide 6 (PA6) with a relative viscosity $\eta_{rel}$=2.4 was fed to a nozzle orifice 3 with 58 holes 4 at intervals of 1.5 mm and with a diameter of 0.4 mm. The distance from the outlet openings of the holes 4 to the narrowest cross-section of the Laval nozzle was 12.0 mm (the outlet openings ended 2.0 mm above the imaginary plane of the Laval nozzle plate). With a throughput per hole 4 of 0.25 g/min and a pressure in the chamber 8 of 0.02 bar above the environment, filaments with a mean diameter $d_{50}$ of 4.1 μm were produced.

EXAMPLE 3

With the apparatus from example 1, polypropylene (PP) with a MFI of 25 (230° C., 2.16 kg) was fed to a nozzle orifice 3 with three holes 4 at intervals of 15 mm and with a diameter of 1.0 mm. Individual rotationally symmetrical Laval nozzles 6 were arranged in the Laval nozzle plate 3 coaxially with the three holes 4. The outlet openings of the holes 4 were arranged exactly at the level of the upper edge of the Laval nozzle plate and had a distance of 4.5 mm from the narrowest cross-section of the Laval nozzles 6. At a pressure in the chamber 8 of 0.75 bar above the environment 7 and with a throughput per hole 4 of 9.3 g/min, single filaments with a mean diameter $d_{50}$ of 4.9 μm were produced. In this case a theoretical thread count of 123 results.

Of interest in this manner of operation is the observation that the bursting point compared with example 1 has clearly shifted in the direction of the narrowest cross-section of the Laval nozzles 6. Whereas in the case of the slot-like Laval nozzle 6 this point is about 25 mm below the narrowest cross-section, the distance in the case of the rotationally symmetrical Laval nozzle 6 is only about 5 mm. The observation is explained by the fact that, due to the rotationally symmetrically enclosure of the melt thread, higher shear stresses were transmitted to it, and therefore it is drawn more rapidly to the smaller diameter yielding the bursting point. Moreover, the pressure in the free jet after leaving the Laval nozzle 6 does not drop suddenly to the ambient pressure, but only after a certain running length. The free jet characteristics are however in the planar case different to those in the rotationally symmetrical case.

What is claimed is:

1. Method for the manufacture of essentially endless fine threads from meltable polymers, comprising the steps:

spinning polymer melt from at least one spin hole to form a thread, passing the thread through a Laval nozzle, and accompanying the melt stream by a surrounding gas streams, wherein the spun thread is drawn by the gas streams which are accelerated to high speed by means of the Laval nozzle, and controlling, with a given geometry of the melt hole and its position relative to the Laval nozzle, the temperature of the polymer melt, its throughput per spin hole and the pressures in front of and behind the Laval nozzle which define the speed of the gas streams in such a way that the thread before solidification thereof attains a hydrostatic pressure in its interior which is greater than the gas pressure surrounding it, such that the thread bursts and splits into a plurality of fine threads.

2. Method according to claim 1, wherein the gas flow around the at least one thread is laminar.

3. Method according to claim 1, wherein the space behind the Laval nozzle is at ambient pressure or, in case of further processing of the threads, is at a pressure slightly above ambient pressure, which is necessary for further processing.

4. Method according to claim 1, wherein the gas streams which draw the thread are at ambient temperature or a temperature caused by their supply.

5. Method according to claim 1, wherein the ratio of the pressures in the space above and below the Laval nozzle when using air is selected between 1.02 and 2.5, depending on the polymer, its throughput and melting temperature.

6. Method according to claim 1, wherein the thread emerging from the spin hole is heated by radiation in the region of the Laval nozzle.

7. Method according to claim 1, wherein a plurality of threads are spun and split, which are deposited to form a non-woven fabric or further processed into yarns.

8. Method for the manufacture of essentially endless fine threads from meltable polymers, comprising the steps:

spinning polymer melt from at least one spin hole to form a thread, passing the thread through a Laval nozzle, and accompanying the melt stream by a surrounding gas streams, wherein the flow of the gas streams around the at least one thread is laminar, and wherein the spun thread is drawn by the gas streams which are accelerated to high speed by means of the Laval nozzle, and controlling, with a given geometry of the melt hole and its position relative to the Laval nozzle, the temperature of the polymer melt, its throughput per spin hole and the pressures in front of and behind the Laval nozzle which define the speed of the gas streams in such a way that the thread before solidification thereof attains a hydrostatic pressure in its interior which is greater than the gas pressure surrounding it, such that the thread bursts and splits into a plurality of fine threads.

9. Method according to claim 8, herein the space behind the Laval nozzle is at ambient pressure or, in case of further processing of the threads, is at a pressure slightly above ambient pressure, which is necessary for further processing.

10. Method according to claim 8, wherein the gas streams which draw the thread are at ambient temperature or a temperature caused by their supply.

11. Method according to claim 8, wherein the ratio of the pressures in the space above and below the Laval nozzle when using air is selected between 1.02 and 2.5, depending on the polymer, its throughput and melting temperature.

12. Method according to claim 8, wherein the thread emerging from the spin hole is heated by radiation in the region of the Laval nozzle.

13. Method according to claim 8, wherein a plurality of threads are spun and split, which are deposited to form a non-woven fabric or further processed into yarns.

* * * * *